(12) United States Patent
Hesse et al.

(10) Patent No.: US 8,710,144 B2
(45) Date of Patent: Apr. 29, 2014

(54) POWDER FOR LAYERWISE MANUFACTURING OF OBJECTS

(75) Inventors: Peter Hesse, Cologne (DE); Tillmann Paul, Cologne (DE); Richard Weiss, Cologne (DE)

(73) Assignee: EOS GmbH Electro Optical Systems, Krailling (DE)

( * ) Notice: Subject to any disclaimer, the term of this patent is extended or adjusted under 35 U.S.C. 154(b) by 594 days.

(21) Appl. No.: 11/932,500

(22) Filed: Oct. 31, 2007

(65) Prior Publication Data
US 2008/0152910 A1      Jun. 26, 2008

Related U.S. Application Data

(63) Continuation of application No. 10/816,171, filed on Apr. 2, 2004, now abandoned, which is a continuation of application No. PCT/EP2004/002965, filed on Mar. 21, 2004.

(51) Int. Cl.
*C08J 3/12* (2006.01)
*C08G 65/40* (2006.01)
*C08G 67/00* (2006.01)

(52) U.S. Cl.
USPC ............................ 524/592; 524/493; 524/495

(58) Field of Classification Search
USPC ......................................... 524/592, 493, 495
See application file for complete search history.

(56) References Cited

U.S. PATENT DOCUMENTS

| | | | |
|---|---|---|---|
| 4,764,424 A | 8/1988 | Ganga et al. | |
| 4,793,853 A | 12/1988 | Kale | |
| 4,919,853 A | 4/1990 | Alvarez et al. | |
| 4,960,818 A | 10/1990 | Reilly et al. | |
| 5,171,489 A | 12/1992 | Hirao et al. | |
| 5,247,052 A | 9/1993 | Lücke et al. | |
| 5,357,040 A | 10/1994 | McGrath et al. | |
| 5,370,911 A | 12/1994 | Throne et al. | |
| 5,731,388 A | 3/1998 | Suzuki et al. | |
| 5,733,497 A | 3/1998 | McAlea et al. | |
| 5,910,558 A | 6/1999 | Schoenherr et al. | |

(Continued)

FOREIGN PATENT DOCUMENTS

CA      2 251 405      3/2005
CA      2 564 971      11/2005

(Continued)

OTHER PUBLICATIONS

Trade brochure "DuraForm PA et GF", 3D Systems (2001).

(Continued)

*Primary Examiner* — Kelechi Egwim
(74) *Attorney, Agent, or Firm* — Seyfarth Shaw LLP

(57) ABSTRACT

The invention describes powders for use in the production of spatial structures, i.e. molded bodies, using layer build-up methods, as well as methods for their efficient production. The powders have the special feature that they have good flow behavior, for one thing, and at the same time, have such a composition that the molded body that can be produced with the powder, using rapid prototyping, has significantly improved mechanical and/or thermal properties. According to a particularly advantageous embodiment, the powder has a first component that is present in the form of essentially spherical powder particles, which is formed by a matrix material, and at least one further component in the form of stiffening and/or reinforcing fibers, which are preferably embedded in the matrix material.

42 Claims, 4 Drawing Sheets

(56) References Cited

U.S. PATENT DOCUMENTS

Figure 1:
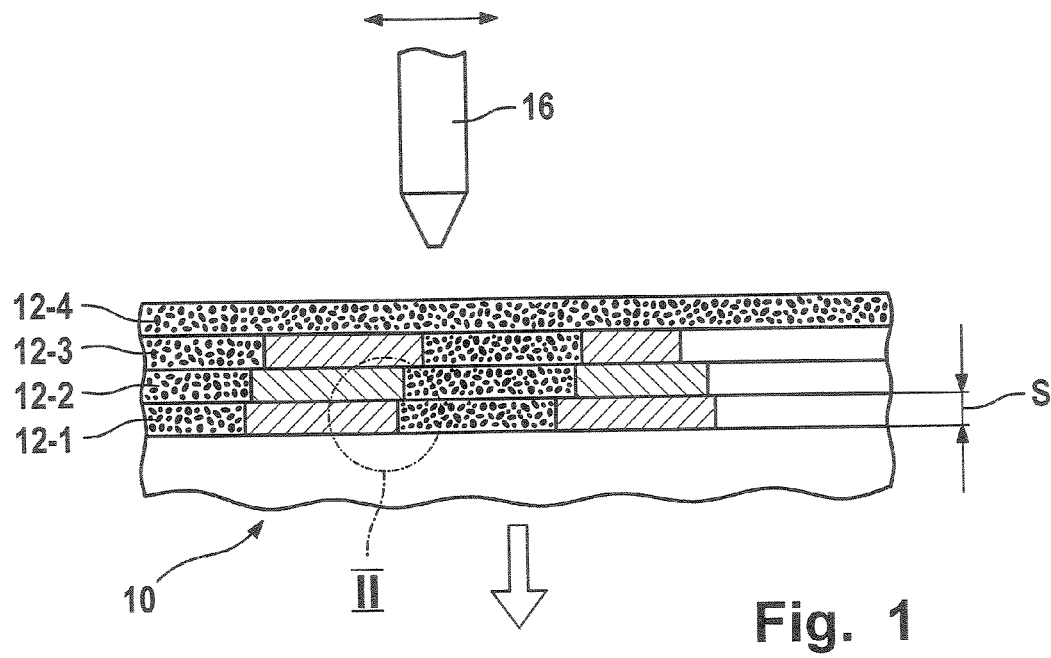

| | | | |
|---|---|---|---|
| 5,925,688 | A | 7/1999 | Ash et al. |
| 6,003,832 | A | 12/1999 | Ueno et al. |
| 6,067,480 | A | 5/2000 | Stuffle et al. |
| 6,136,948 | A | 10/2000 | Dickens, Jr. et al. |
| 6,533,563 | B1 | 3/2003 | Otaigbe et al. |
| 6,949,216 | B2 * | 9/2005 | Brice et al. ............ 264/401 |
| 7,240,520 | B2 | 7/2007 | Edlinger |
| 2001/0050031 | A1 * | 12/2001 | Bredt et al. .......... 106/162.9 |
| 2002/0053257 | A1 | 5/2002 | Brice et al. |
| 2002/0149137 | A1 * | 10/2002 | Jang et al. ............. 264/494 |
| 2002/0185782 | A1 | 12/2002 | Koch et al. |
| 2003/0010409 | A1 | 1/2003 | Kunze et al. |
| 2004/0023145 | A1 | 2/2004 | Moussa et al. |
| 2005/0197446 | A1 | 9/2005 | Loyen et al. |
| 2005/0207931 | A1 * | 9/2005 | Hesse et al. ............. 419/10 |
| 2006/0134419 | A1 | 6/2006 | Monsheimer et al. |
| 2006/0159896 | A1 | 7/2006 | Pfeifer et al. |
| 2007/0267766 | A1 | 11/2007 | Hesse et al. |

FOREIGN PATENT DOCUMENTS

| | | |
|---|---|---|
| CA | 2 530 762 | 6/2006 |
| DE | 43 01 543 A1 | 7/1994 |
| DE | 197 47 309 A1 | 4/1999 |
| DE | 100 55 465 A1 | 5/2002 |
| DE | 101 22 492 A1 | 11/2002 |
| DE | 10 29 305 A1 | 12/2002 |
| DE | 101 29 305 A1 | 12/2002 |
| DE | 103 26 919 A1 | 1/2004 |
| DE | 10 2004 020 452 A1 | 12/2005 |
| DE | 102004062761 A1 | 6/2006 |
| EP | 0 001 879 B2 | 5/1979 |
| EP | 0 026 806 A1 | 4/1981 |
| EP | 0 196 972 B1 | 10/1986 |
| EP | 0 377 170 A2 | 7/1990 |
| EP | 0 879 137 B1 | 11/1998 |
| EP | 0 968 080 B1 | 1/2000 |
| EP | 1 170 318 A1 | 1/2002 |
| EP | 1 571 173 A1 | 9/2005 |
| EP | 1 674 497 A1 | 6/2006 |
| FR | 1 525 016 | 5/1968 |
| FR | 2 803 243 | 7/2001 |
| GB | 1 147 052 | 6/1966 |
| GB | 1147052 A * | 4/1969 |
| JP | 8-505180 A | 6/1996 |
| JP | 2000-505737 A | 5/2000 |
| JP | 2003-531220 A | 10/2003 |
| RU | 1291287 A1 | 2/1987 |
| RU | 94041837 A1 | 8/1996 |
| RU | 2 086 356 C1 | 8/1997 |
| RU | 2 223 994 C2 | 6/2003 |
| WO | WO 92/02142 | 2/1992 |
| WO | WO 93/18900 | 9/1993 |
| WO | WO 94/15999 | 7/1994 |
| WO | 98/09798 A1 | 3/1998 |
| WO | WO 00/58389 | 10/2000 |
| WO | 01/78969 A2 | 10/2001 |
| WO | WO 02/11928 A1 | 2/2002 |
| WO | WO 02/11929 A1 | 2/2002 |
| WO | WO 02/070031 A1 | 9/2002 |
| WO | WO 03/106146 A1 | 12/2003 |

OTHER PUBLICATIONS

Trade brochure "DuraForm PA et GF", 3D Systems (2001) (previously filed on Jun. 25, 2009. (Submitting English translation only).

P. Forderhase, et al., "The Development of a SLS® Composite Material", Solid Freeform Fabrication Proceedings, The University of Texas at Austin, pp. 287-297 (Sep. 1995).

J.P. Schultz, et al., "Selective Laser Sintering of Nylon 12-PEEK Blends Formed by Cryogenic Mechanical Alloying", Solid Freeform Fabrication Proceedings, The University of Texas at Austin, pp. 119-124 (Aug. 2000).

J. Schultz, et al., "Cryogenic Mechanical Alloying of Poly (ether ether ketone)—Polycarbonate Composite Powders for Selective Laser Sintering", Solid Freeform Fabrication Proceedings, The University of Texas at Austin, pp. 311-318 (Aug. 1999).

C.K. Chua, et al., "Development of Scaffolds for Tissue Engineering Using Selective Laser Sintering", RAPID Conference & Exposition, Chicago, IL, pp. 1-9 (May 12-15, 2003).

* cited by examiner

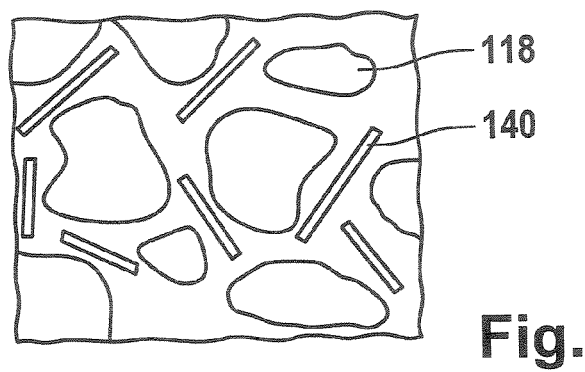
Fig. 4
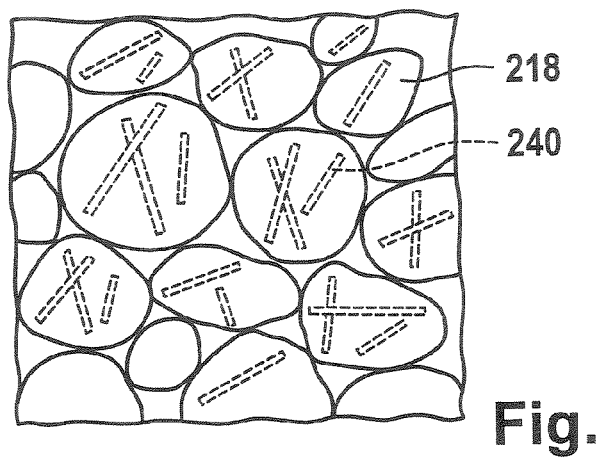
Fig. 5
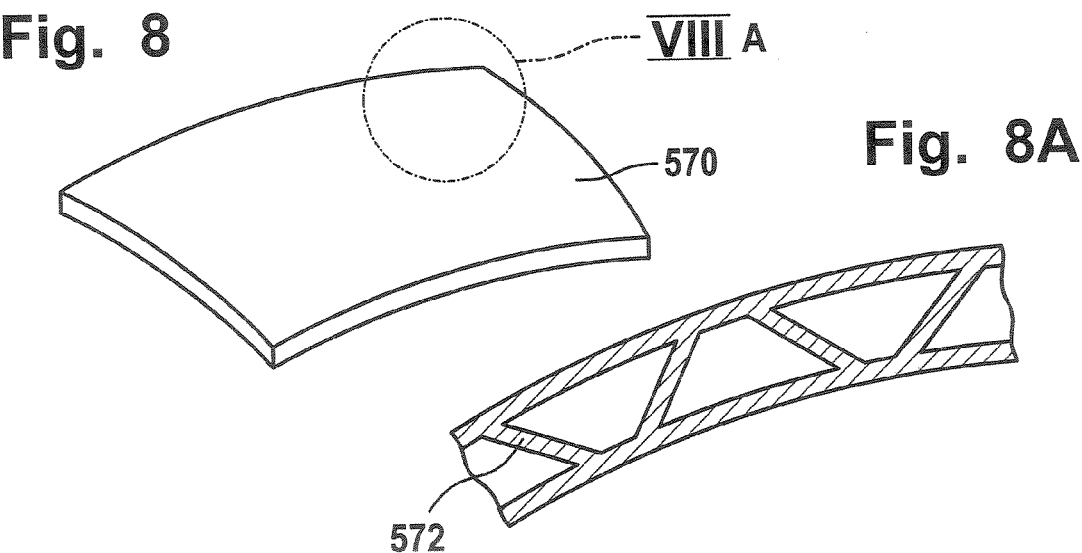
Fig. 8
Fig. 8A

POWDER FOR LAYERWISE MANUFACTURING OF OBJECTS

This is a continuation application of U.S. application Ser. No. 10/816,171, filed Apr. 2, 2004, which is a continuation of PCT/EP04/02965 filed on Mar. 22, 2004.

BACKGROUND OF THE INVENTION

1. Field of the Invention

The invention relates, in general, to the production of spatial, particularly spatially complex structures, i.e. molded bodies, by means of layer build-up methods, as they are also known under the term "powder-based generative rapid prototyping" or "solid free form fabrication" (SFF) methods. Such powder-based generative rapid prototyping methods are known, for example, under the designations 3D laser sintering, 3D laser melting, or 3D printing.

The invention particularly relates to a powder for use in such a method, as well as to methods for the efficient production of such a powder.

Methods for the production of molded bodies having a complex structure, which are generally computer-controlled, additive, automatic methods, work with bulk of powdered materials, which are heated in layers, at certain points or in certain regions, to such an extent that a melting or sintering process occurs. For heating, a laser beam, preferably a program-controlled laser beam or, when using metallic powder materials, a high-energy electron beam is used.

In the meantime, various powders have been developed for this technology, whereby reference can be made, in this regard, particularly to the documents DE 101 22 492 A1, EP 0 968 080 B1, WO 03/106146 A1, or DE 197 47 309 A1, for the sector of plastic powders, or to WO 02/11928, for the sector of metallic powders.

In order to be able to conduct the shaping process without problems, at a high process stability, powder particles that are characterized by particularly good "flow behavior" during application of the powder layer are required, and this is assured in that the powder particles are configured to be as spherical as possible, with the smoothest possible surface.

Until now, polyamide, particularly a highly cross-linked polyamide, such as PA 11 or PA 12, has particularly proven itself as a material for the method described initially.

However, with this powder material, the spectrum of use of the molded bodies produced with it is limited. Therefore, various attempts have already been made to modify the powders, in order to improve the mechanical properties of the molded body. One approach was seen in mixing the thermoplastic powder with glass beads or aluminum flakes.

It is true that a good flow capacity is maintained with the glass beads, but the improvements in mechanical properties that can be achieved are limited. It is true that stiffening of the material is possible (increase in the modulus of elasticity), but it was not possible to significantly increase the tensile strength, and the improvements that could be achieved were obtained at the expense of the material becoming brittle. This problem is even more marked when using aluminum flakes.

The invention is therefore based on the task of improving the method for the production of molded bodies by means of selective sintering or melting of powdered materials, in such a manner that while maintaining the fundamental design of the machine, molded bodies having significantly improved mechanical properties can be produced.

This task is accomplished by means of a new powder according to claims 1 and 2, as well as by means of a method for the production of such powders, according to claims 14, 15, 20, and/or 25.

According to a first aspect of the invention (claim 1), the essentially spherical powder particles are formed by an aromatic polyether ketone plastic, particularly a polyaryl ether ketone (PEEK) plastic, having the repetition unit oxy-1,4-phenylene-oxy-1,4-phenylene-carbonyl-1,4-phenylene according to the following formula:

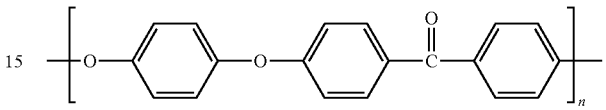

This linear, aromatic polymer, which is marketed by the Victrex company under the name "PEEK," is generally semi-crystalline and is characterized by physical properties that are far superior to the materials used in SLS methods until now, in every regard. Not only the mechanical properties, such as tensile strength and modulus of elasticity, are many times better than in the case of conventional PA powders. In addition, the thermal stability of this material is so good that the components produced from this material according to the SLS method can even be used where until now, even fiber-reinforced plastics were not up to the job.

The inventors have recognized that this material can be processed to form powder particles that are smooth and spherical, to the greatest possible extent, using a suitable method, particularly by means of the methods of claims 14, 20, and/or 25, which particles thereby guarantee a sufficiently good flow capacity of the powder, so that the individual layers can be applied with the greatest possible precision.

According to a second aspect of the invention, a powder is made available, having a first component present in the form of essentially spherical powder particles that is formed by a matrix material, and having at least a further component in the form of stiffening and/or reinforcing fibers. In this connection, the matrix material can be a plastic or a metal. Studies have shown that if the volume proportion of the fibers, depending on the fiber length distribution, remains limited, for example to a maximum of 25%, preferably to up to 15%, particularly preferably up to 10%, the flow capacity of the powder can be controlled well. The experimental results show that using PA12 as the matrix material, triple the stiffness and a 50% increase in tensile strength can be achieved with as little as 10 vol.-% fiber proportion (carbon fibers).

To further improve the mechanical properties, the fiber proportion should be increased. According to the invention, the powder with the highest volume proportion of fiber is produced using the production methods according to claims 14, 15, 20, and/or 25, whereby it is possible to embed the fibers into the matrix material, preferably in such a manner that they are essentially completely surrounded by the matrix material. In this manner, the handling of the powder remains essentially uninfluenced by the volume proportion of the fiber material. Using PA12 as the matrix material and using a volume proportion of the carbon fibers of 30%, an increase in tensile strength of 300% and an increased in the modulus of elasticity by a factor of 9 can be achieved.

If a thermoplastic plastic is used as the matrix material, significant improvements in the mechanical properties as compared with the non-reinforced material can be achieved even if flakes are used instead of fibers, as long as their dimensions permit preferably complete embedding into the powder particles. This aspect is explicitly included in the object of the invention.

If the matrix material is formed by a plastic material, the fibers are preferably selected from the group of carbon and/or glass fibers.

Fundamentally, the powder can be produced in all the grades that have been processed until now, whereby the powder particles can have an average diameter d$50$ in the range of 20 to 150, preferably from 40 to 70 µm. The spread of the grain size distribution should be as narrow as possible, so that the flow capacity is not impaired too greatly.

The matrix material can, of course, also be formed by a metallic material. This does not fundamentally change anything with regard to the production methods of the powder particles having embedded fibers, according to claims 15, 20, and/or 25.

A metallic matrix material is preferably combined with fibers from the group of ceramic fibers and boron fibers.

In this case, it is advantageous if the average grain size d$50$ of the spherical powder particles lies between 10 and 100, preferably between 10 and 80 µm. The value of d$50$ refers to that dimension of the grain size that is exceeded by 50% of the powder particles, and 50% of the powder particles lie below it.

The fiber length distribution is selected in such a manner that as low a percentage of the fibers as possible projects out of the surface of the particles that are formed during melt-spraying or spray-drying. This can be achieved, for example, in that the average length L$50$ of the fibers corresponds to maximally the value of the average grain size d$50$ of the spherical powder particles.

A first advantageous method for the production of a powder, particularly according to one of claims 1 to 13, is the object of claim 14. Using this method, it is possible to produce essentially spherical powder particles, as a function of the process parameters, which can be changed; it is true that these particles are composed of a plurality of smaller particles, but they have a sufficiently spherical and smooth surface so that they can be used in rapid prototyping methods, without problems.

This method can be carried out, equally advantageously, in the presence of a second phase in the form of a stiffening or reinforcing fiber. All liquids that permit a uniform distribution of the micropowder particles and, optionally, of the reinforcing phase, can be used as the liquid phase of the suspension. Another relevant aspect in the selection of the liquid is the property that it vaporizes or evaporates quickly and without leaving a residue.

Preferably, in this method, if the matrix material has been selected from the group of thermoplastics, micropowder having an average grain size d$50$ between 3 and 10 µm, preferably 5 in and, optionally, fibers, preferably having an average length L$50$ of 20 to 150 µm, preferably 40 to 70 µm, are used. The value L$50$ designates the length that is exceeded by 50% of the fibers, and 50% of the fibers lie below this value.

Claim 17 indicates advantageous dimensions of the particles for metal as the matrix material.

An alternative method for the production of the powder according to the invention is the object of claim 20. It is mainly of interest for thermoplastic materials, but can fundamentally be used also for metallic materials. In this connection, the step of cooling is absolutely necessary for thermoplastic materials, so that the material is made brittle to such an extent that it can be ground. Advantageously, the cooling takes place by means of liquid nitrogen. Other advantageous embodiments of this method are the object of claims 22 to 24.

A third alternative of the production method is so-called melt-spraying according to claim 25, which can also be used for metallic and thermoplastic materials. Important process parameters for adjusting the desired grain size distribution are: temperature of the melt; viscosity and surface tension of the melt; die diameter; speed, volume flow, pressure, and temperature of the gas stream.

Preferably, atomization of the melt takes place in a hot gas jet.

Using the powder according to the invention, which can be produced using a method according to the invention, it is possible to clearly expand the area of application of components or molded parts that have been generated by means of layer build-up methods (powder-based generative rapid prototyping), such as according to SLS (selective laser sintering) or laser melting technology. Using the invention, it is therefore possible, for the first time, to use such a layer build-up method, in practical manner, for the production of hollow molded bodies having interior reinforcements, preferably three-dimensional framework-like reinforcements. This is because until now, the mechanical properties of the material were so low that even with reinforcing structures, it was not possible to use the material in areas that were under thermal and/or mechanical stress.

Figure 2:
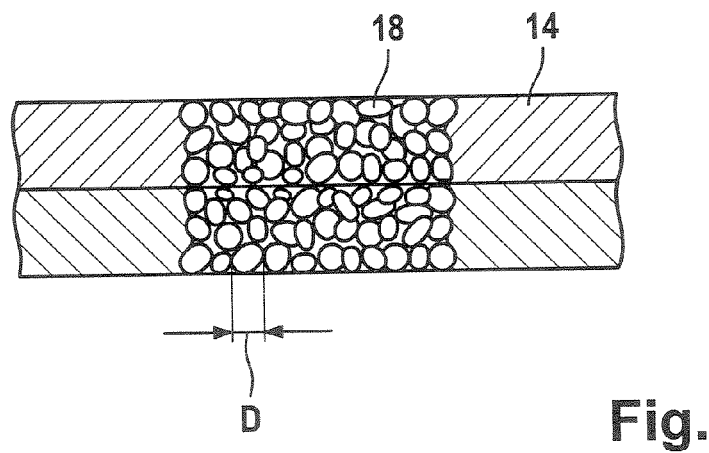
Figure 3:
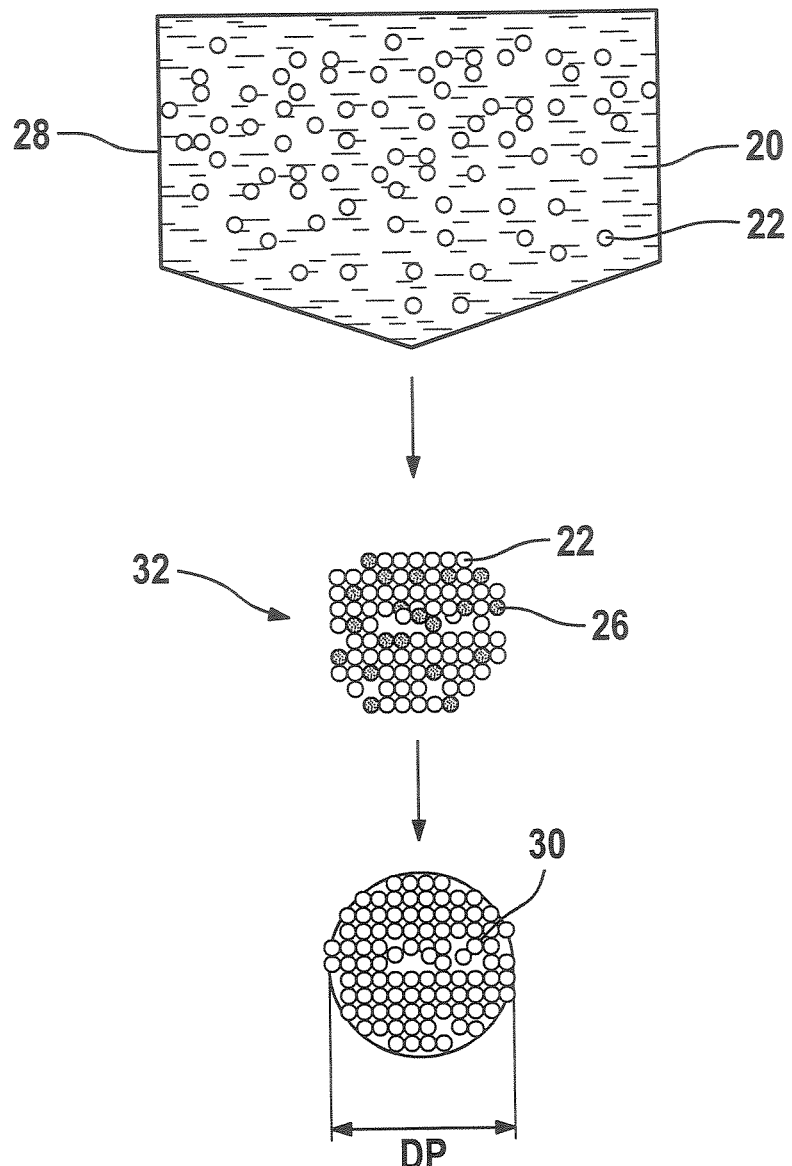
Figure 6:
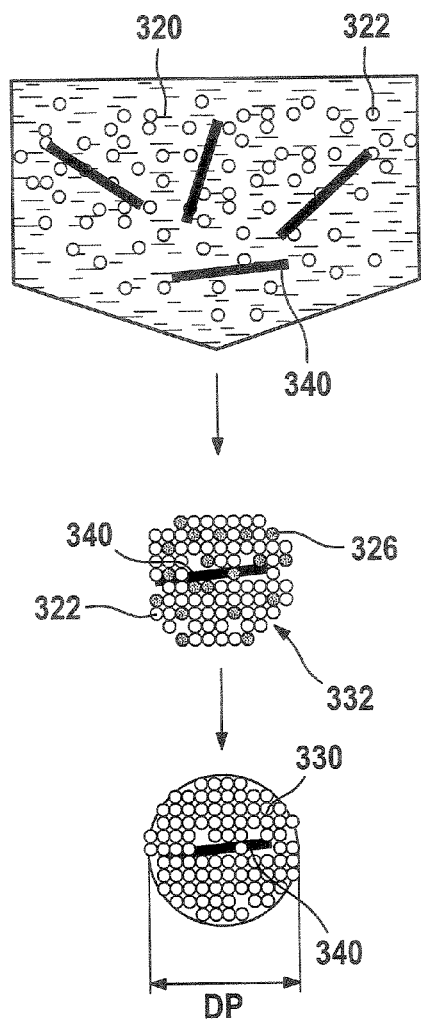
Figure 7:
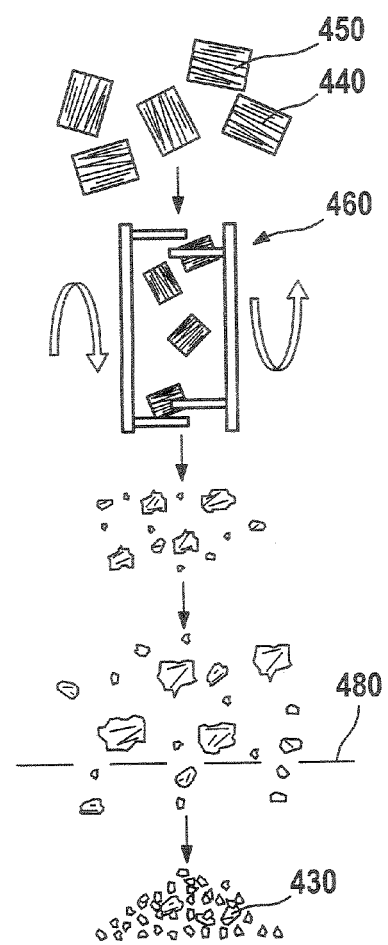

In the following, the invention will be explained in greater detail, using exemplary embodiments:

The drawing shows:

FIG. 1 a fundamental diagram to show the functional principle of the layer build-up method;

FIG. 2 the detail II in FIG. 1;

FIG. 3 a schematic representation of a method for the production of the powder according to a first embodiment;

FIG. 4 a schematic view of a powder according to a further embodiment of the invention;

FIG. 5 a schematic view of a powder according to a further variant of the invention;

FIG. 6 a schematic representation of a method for the production of the powder according to FIG. 5, corresponding to one embodiment;

FIG. 7 a schematic representation of another method for the production of the powder according to FIG. 5;

FIG. 8 a schematic view of a cut-out of a component that can be produced using the powder according to the invention; and FIG. 8A the detail VIII in FIG. 8.

FIG. 1 schematically shows how a component is produced by means of layer build-up methods. It can be seen that successive powder layers 12-1, 12-2, ... 12-n having a thickness S are being applied to a platform 10 that can be lowered into a construction space, step by step. After a layer has been applied, the particles 18 (see FIG. 2) are selectively melted in targeted areas, completely or in part, by an energy beam from an energy source 16, whereby the regions 14 indicated with cross-hatching in the figure are formed, which thereby become an integral part of the component being produced. The platform is subsequently lowered by the layer thickness S, whereupon a new powder layer having the layer thickness S is applied. The energy beam passes over a predetermined area once again, whereby the corresponding regions are melted and melded, i.e. joined with the regions in the previous layer that were melted. In this manner, a multi-layer powder block having an embedded molded body of a complex structure is gradually formed. The molded body is removed from the powder block and generally the residual powder that adheres to it or is sintered to it is cleaned away manually.

The layer thickness is selected to be between 20 and 300 µm, depending on the area of application, whereby the majority of the powder particles 18 have a grain size D of approximately ⅓ of the layer thickness S, as can be seen in FIG. 2.

Conventionally, the powder is formed by a thermoplastic, for example PA 11 or PA 12, whereby the mechanical strength of the molded bodies remains limited, due to the low modulus of elasticity in the range of 1.4 GPa, and the low tensile strength in the range of 40 to 50 MPa.

The invention gives different approaches for the production of molded bodies having significantly improved mechanical properties, which will be explained in greater detail in the following:

Embodiment 1:

The powder has a first matrix component that is present in the form of essentially spherical powder particles (18), which is formed by an aromatic polyether ketone plastic, particularly a polyaryl ether ketone (PEEK) plastic, having the repetition unit oxy-1,4-phenylene-oxy-1,4-phenylene-carbonyl-1,4-phenylene of the general formula

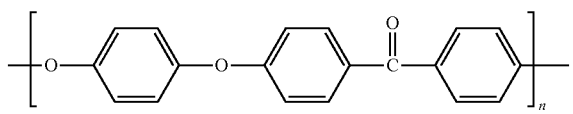

Such a material can be purchased, for example, under the trade name "PEEK," from the company Victrex Plc. The material properties lie at a tensile strength of more than 90 MPa and a modulus of elasticity in the range of more than 3.5 GPa (according to ISO 527). In addition, this material is characterized by an extremely good temperature stability, so that the molded parts built from it can be used even in areas that are subject to great thermal stress.

The production of powder particles from this material preferably takes place according to one of the following methods:
1. Spray-drying,
2. Grinding; and
3. Melt-spraying.

Spray-Drying:

For this purpose, as can be seen in FIG. 3, a suspension is first produced, having a matrix micropowder 22 stirred into a liquid phase, such as ethanol or an ethanol/water mixture 20. The particles of the matrix micropowder 22 have dimensions that lie significantly below the particle size DP of the powder particle 30 to be produced. In this connection, uniform mixing of the phases in the vessel must be assured.

The suspension is sprayed through a nozzle, not shown in detail, whereby droplets 32 containing matrix micropowder are formed. The liquid phase 26, specifically the surface tension of this phase, guarantees an essentially spherical shape of the droplets.

Subsequently, for example in a subsequent heating segment, the liquid component 26 of the droplets 32 is vaporized and/or evaporated, leaving essentially spherical agglomerates 30 behind. These agglomerates 30 form the powder particles to be used in the subsequent layer build-up method. Accordingly, the process parameters of the method are selected in such a manner that the particles are produced in the desired grain size distribution.

Grinding:

An alternative method consists in that the material, which can be purchased, for example, as a coarse granulate having a grain size of approximately 3 mm, is ground to produce a suitable micropowder.

In this process, the coarse granulate is first cooled to a temperature that lies below the temperature at which the material becomes brittle. Cooling takes place, for example, by means of liquid nitrogen. In this state, the coarse granulate can be ground in a pinned disk mill, for example. The ground powder is finally separated, preferably in an air separator, to obtain a predetermined fraction spectrum.

The method step of grinding can take place with additional cooling.

In order for the ground powder to get a sufficiently smooth and preferably spherical surface, it is advantageous to subject the ground material to smoothing treatment, for example by embedding or accumulation of microparticles and/or nanoparticles, such as Aerosil.

Melt-Spraying:

A third method variant of the production of micropowder made of aromatic polyether ketone, particularly a polyaryl ether ketone, consists in that a melt-spraying method is used.

In this process, the material is melted in a crucible that has a connection to a spray nozzle with which the material is atomized.

In this process, small droplets leave the nozzle. Because of the surface tension of the material, these droplets assume an essentially spherical shape. If the droplets are subsequently moved through a cooling segment, they solidify in this spherical shape, so that powder is present in the grade desired for the layer build-up method.

Preferably, hot gas is used for the atomization. The hot gas that is used for spraying, i.e. for atomization of the melted material, is produced by means of a so-called pebble heater.

As a rule, a separating step follows the method step of spraying, in order to obtain powder particles in accordance with a predetermined fraction spectrum.

Embodiment 2:

As shown schematically in FIG. 4, powder having a first component present in the form of essentially spherical powder particles 118, which is formed by a matrix material, and at least one further component in the form of stiffening and/or reinforcing fibers 140. The matrix component can be formed by a metal or by a thermoplastic plastic was used.

The following experimental example was carried out:

PA12 powder having a grain size distribution with d50 at about 50 µm was mixed with 10 vol.-% carbon fibers of two different types, having an average fiber length L50 of about 70 µm and a fiber thickness of 7 µm. It was possible to process the powder obtained in this way on commercially available rapid prototyping machines, to produce defect-free molded bodies.

It was possible to significantly improve the mechanical properties of the sample body produced on the basis of this powder/fiber mixture, according to the layer build-up method, as compared with a component that did not contain any fibers. Specifically, it was possible to increase the modulus of elasticity to more than 3.8 GPa and the tensile strength to approximately 70 MPa.

These experimental results were compared with results obtained with components that were obtained by means of injection-molding of PA12 mixed with fibers, whereby the fibers that were added to the injection-molding mass were present in the same volume concentration and the same size distribution. The measured results show that the mechanical properties of the components obtained according to the layer build-up method are not inferior, in any regard, to those of the injection-molded parts. In fact, it was actually possible to increase the modulus of elasticity in the case of the sintered body.

Although the proportion of fibers in the micropowder can be varied, depending on the average grain size and its distribution, it generally cannot be raised above 25% without causing problems. In order to nevertheless be able to achieve improved material properties, the third embodiment of the invention is offered.

Embodiment 3:

According to the third embodiment, which is illustrated schematically in FIG. 3, a powder is created that contains significantly higher proportions of fiber, namely above 30 vol.-%, but nevertheless has such a composition that it can be used in a layer build-up method, because of its good flow capacity.

The particular feature is that the fibers 240 are embedded in essentially spherical powder molded bodies 218, which form the matrix material of the component to be produced, preferably in such a manner that they are essentially completely surrounded by the matrix material, as shown in FIG. 5.

For the production of such a powder, the methods described above, i.e. spray-drying, grinding, and melt-spraying, can be used with slight modifications:

Spray-Drying:

This method is shown schematically in FIG. 6. It differs from the method described above, on the basis of FIG. 3, only in that not only matrix micropowder 322 but also stiffening or reinforcing fibers 340 are stirred into the liquid phase, such as an ethanol or an ethanol/water mixture 320. The particles of the matrix micropowder 322 have dimensions that lie significantly below the particle size DP of the powder particle 330 to be produced. The fiber lengths are also selected in such a manner that their average length is not greater than the average grain size of the powder particles to be achieved. In this connection, again, uniform mixing of the phases in the vessel must be assured.

When spraying the suspension through a nozzle, not shown in detail, droplets 332 that contain matrix micropowder and fiber(s) form. The liquid phase 326, specifically the surface tension of this phase, guarantees an essentially spherical shape of the droplets.

If, subsequently, the volatile component 326 of the droplets 332 is vaporized and/or evaporated, again, essentially spherical agglomerates 330 remain behind. These agglomerates 330 form the powder particles to be used in the subsequent layer build-up method. Accordingly, the process parameters are selected in such a manner that the particles are produced in the desired grain size distribution.

Good results can be achieved with the spray-drying if micropowders having an average grain size d50 between 3 and 10 μm, preferably 6 μm, are used.

If fibers are stirred in, they should preferably be used at an average length L50 from 20 to 150 μm, preferably 40 to 70 μm.

In the case of a metallic matrix material, the lengths of the fibers should generally be selected to be shorter. An advantageous range for the average fiber length L50 lies between 10 and 100 μm, preferably between 10 and 80 μm.

It is advantageous to adjust the process parameters in such a manner that essentially spherical microdroplets having an average diameter D50 of 10 to 70 μm are formed.

The vaporization and/or evaporation step is advantageously carried out while the droplets are being moved through a heating segment.

Grinding:

An alternative method, which is shown schematically in FIG. 7, consists in that a material containing fibers, for example carbon fibers 440, which material is present, for example, as a coarse granulate 450 having a grain size or edge length of about 3 mm, is ground to produce a suitable micropowder.

In this process, the coarse granulate 450 is again cooled to a temperature that lies below the temperature at which the material becomes brittle. Cooling takes place, for example, by means of liquid nitrogen. In this state, the coarse granulate can be ground, for example, in a pinned disk mill, indicated as 460. The ground powder is finally separated in a separator 480, preferably in an air separator, in accordance with a predetermined fraction spectrum that is to be achieved. The powder particles to be used are indicated as 430.

In this connection, the method step of grinding can again take place with additional cooling. Also, an optional smoothing process, by means of embedding or accumulation of microparticles and/or nanoparticles, such as Aerosil, can follow.

Melt-Spraying:

The third method embodiment described above, namely so-called melt-spraying, can also be used for the production of powder according to FIG. 5.

In contrast to the method described above, the fiber component is stirred into the melted melt of the matrix material.

The embodiments described above allow the processing of both thermoplastic plastic materials and metallic materials.

Different materials can also be mixed.

If the matrix material is formed by a thermoplastic plastic material, the fibers are selected from the group of carbon and/or glass fibers.

The average grain size of the spherical powder particles is fundamentally not supposed to be restricted. Good results with commercially available machines can certainly be achieved if the average grain size d50 of the spherical powder particles lies in the range of 20 to 150, preferably 40 to 70 μm. The flow capacity of such a powder can be further increased by homogenization of the size distribution.

If the matrix material is formed by a metallic material, the fibers are preferably selected from the group of ceramic fibers and boron fibers. In the case of such a powder, the average grain size d50 of the spherical powder particles generally lies at a low value, for example in the range of 10 and 100, preferably 10 to 80 μm.

From the description, it becomes evident that using the powder according to the invention, by using layer build-up methods (powder-based generative rapid prototyping method), such as according to SLS (selective laser sintering) or laser melting technology, it is possible to produce spatial structures, i.e. molded bodies, whose mechanical and/or thermal properties were previously unthinkable.

Thus, the modulus of elasticity of PEEK, if it is reinforced with 10, 20, or 30 vol.-% carbon fibers, which are introduced into the powder particles or mixed with them, according to one of the methods described, can be increased to 7, 13.5, and 22.2 GPa, respectively, while it was possible to raise the tensile strength to 136, 177, and 226 MPa, respectively.

If PA12 is used as the matrix material, an improvement of the mechanical properties occurs as follows, with a fiber proportion of 10, 20, and 30 vol.-%: modulus of elasticity 3.4, 6.6, and 13.9 GPa, respectively; tensile strength 66, 105, and 128 MPa, respectively.

In this way, it is possible, for the first time, as indicated schematically in FIGS. 8, 8A, to use the layer build-up method for the production of hollow molded bodies 570, having a complex shape, for example multiple curvatures, with interior reinforcements, preferably three-dimensional framework-like reinforcements 572, in practical manner, making it possible to produce components that are not only extremely light, but also can withstand great thermal and mechanical stress.

Of course, deviations from the embodiments described above are possible, without leaving the basic idea of the invention. Thus, subsequent treatment steps of the individual powder production methods can also be used for different methods. The smoothing process to be carried out by means of microbodies can, of course, also be used for the two methods described as alternatives.

The invention therefore creates new powders for use in the production of spatial structures, i.e. molded bodies, using layer build-up methods, as well as methods for their efficient production. The powders have the special feature that they have good flow behavior, for one thing and, at the same time, have such a composition that the molded body that can be produced with the powder, using rapid prototyping, has significantly improved mechanical and/or thermal properties. According to a particularly advantageous embodiment, the powder has a first component that is present in the form of essentially spherical powder particles, which is formed by a matrix material, and at least one further component in the form of stiffening and/or reinforcing fibers, which are preferably embedded in the matrix material.

The invention claimed is:

1. In solid freeform fabrication of objects using a powder-based generative rapid prototyping or manufacturing process, an improved powder wherein the improvement comprises, the powder having a first fraction that is present in the form of substantially spherical powder particles as a matrix material, and at least one other fraction in the form of strengthening and/or reinforcing fibers, wherein the medium length L50 of the fibers is not greater than the medium grain size d50 of the spherical powder particles and wherein the powder is supplied in an isolated powder form and not in a liquid medium during the freeform fabrication of objects.

2. The powder according to claim 1, wherein the medium grain size $d_{50}$ of the spherical powder particles lies in the range from 40 to 70 μm.

3. In solid freeform fabrication of objects using a powder-based generative rapid prototyping or manufacturing process, an improved powder wherein the improvement comprises, the powder having a first fraction that is present in the form of substantially spherical powder particles as a matrix material, and at least one other fraction in the form of strengthening and/or reinforcing fibers, wherein the medium grain size d50 of the spherical powder particles is in the range from 20 to 150 μm, and wherein the medium length L50 of the fibers is not greater than the medium grain size d50 of the spherical powder and wherein the powder is supplied in an isolated powder form and not in a liquid medium during the freeform fabrication of objects.

4. A powder according to claim 3, wherein the medium grain size $d_{50}$ of the spherical powder particles lies in the range from 40 to 70 μm.

5. The powder according to claim 1 or 3, wherein the fibers and the matrix material are mixed.

6. The powder according to claim 5, wherein the volume fraction of the fibers is up to 25%.

7. The powder according to claim 5, wherein the volume fraction of the fibers is up to 15%.

8. The powder according to claim 5, wherein the volume fraction of the fibers is up to 10%.

9. The powder according to claim 1 or 3, wherein the fibers are embedded into the matrix material.

10. The powder according to claim 9, wherein the fibers are substantially fully enclosed by the matrix material.

11. The powder according to claim 10, wherein the volume fraction of the fibers is greater than 15%.

12. The powder according to claim 10, wherein the volume fraction of the fibers is greater than 25%.

13. The powder according to claim 10, wherein the volume fraction of the fibers is greater than 30%.

14. A powder according to claim 1 or 3 comprising a first fraction that is present in the form of substantially spherical powder particles as a matrix material, and at least one other fraction in the form of strengthening and/or reinforcing fibers, wherein the fibers are embedded into the matrix material.

15. The powder according to claim 14, wherein the fibers are substantially fully enclosed by the matrix material.

16. The powder according to claim 15, wherein the volume fraction of the fibers is greater than 15%.

17. The powder according to claim 15, wherein the volume fraction of the fibers is greater than 25%.

18. The powder according to claim 15, wherein the volume fraction of the fibers is greater than 30%.

19. The powder according to claim 1 or 3, wherein the matrix material is formed from a thermoplastic plastic material.

20. The powder according to claim 12, wherein the thermoplastic plastic material is a polyamide.

21. The powder according to claim 20, wherein the polyamide is PA11 or PA12.

22. The powder according to claim 1 or 3, wherein the fibers are formed from carbon and/or glass fibers.

23. The powder according to claim 1 or 3, wherein the matrix material is formed from an aromatic polyetherketone.

24. The powder according to claim 23, wherein the aromatic polyketone is a polyaryletherketone (PEEK) plastic comprising polymerized units of oxy-1,4-phenylene-oxy-1, 4-phenylene-carbony l-1,4-phenylene of the following formula:

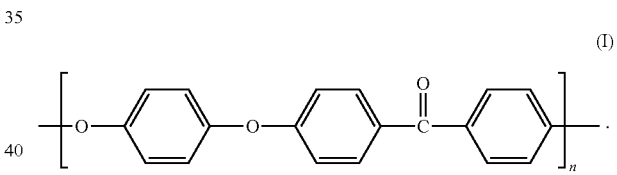

25. The powder according to claim 1 or 3, wherein the matrix material is formed from a metallic material.

26. The powder according to claim 1 or 3, wherein the fibers are selected from the group consisting of ceramic and boron fibers.

27. The powder according to claim 25, wherein the medium grain size d50 of the spherical powder particles lies in the range from 10 to 100 μm.

28. The powder according to claim 26, wherein the medium grain size d50 of the spherical powder particles lies in the range from 10 to 100 μm.

29. The powder according to claim 25, wherein the medium grain size d50 of the spherical powder particles lies in the range from 10 to 80 μm.

30. The powder according to claim 26, wherein the medium grain size d50 of the spherical powder particles lies in the range from 10 to 80 μm.

31. The powder according to claim 14, wherein the matrix material is formed from a thermoplastic plastic material.

32. The powder according to claim 31, wherein the thermoplastic plastic material is a polyamide.

33. The powder according to claim 32, wherein the polyamide is PA11 or PA12.

34. The powder according to claim 14, wherein the fibers are formed from carbon and/or glass fibers.

35. The powder according to claim 14, wherein the matrix material is formed from an aromatic polyetherketone.

36. The powder according to claim 35, wherein the aromatic polyketone is a polyaryletherketone (PEEK) plastic comprising polymerized units of oxy-1,4-phenylene-oxy-1,4-phenylene-carbonyl-1,4-phenylene of the following formula:

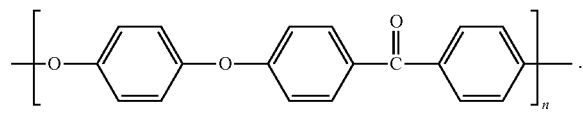
(I)

37. The powder according to claim 14, wherein the matrix material is formed from a metallic material.

38. The powder according to claim 14, wherein the fibers are selected from the group consisting of ceramic and boron fibers.

39. The powder according to claim 37, wherein the medium grain size d50 of the spherical powder particles lies in the range from 10 to 100 μm.

40. The powder according to claim 38, wherein the medium grain size d50 of the spherical powder particles lies in the range from 10 to 100 μm.

41. The powder according to claim 39, wherein the medium grain size d50 of the spherical powder particles lies in the range from 10 to 80 μm.

42. The powder according to claim 38, wherein the medium grain size d50 of the spherical powder particles lies in the range from 10 to 80 μm.

* * * * *